March 8, 1927. 1,619,948
F. MANGIAMELI
DEVICE FOR PROPORTIONATE FEEDING OF GASES
Filed March 15, 1922   2 Sheets-Sheet 2

Patented Mar. 8, 1927.

1,619,948

UNITED STATES PATENT OFFICE.

FRANCESCO MANGIAMELI, OF CORLEONE, ITALY.

DEVICE FOR PROPORTIONATE FEEDING OF GASES.

Application filed March 15, 1922, Serial No. 544,065, and in Germany March 26, 1921.

My invention refers to a method for mixing gases which are stored under pressure in cylinders, tanks, vessels or the like. The usual way for mixing such gases, for instance in the case of use for welding purposes, consists in separately reducing the storing pressure by means of ordinary pressure regulators and thereafter in separately regulating the volumes of each gas by separately working the cocks or closing devices.

My invention gives the possibility to automatically produce a mixture of gases in the desired proportion. For this purpose I use the service pressure of one of the gases for automatically regulating the service pressure of the other gas. For the first gas I use the usual pressure regulator, which is to be operated by hand for reducing the storing pressure to the wanted service pressure, whereas for the second gas a regulator of special construction, according to my invention, will be used. In this regulator I eliminate the ordinary arrangement which was provided to be worked by hand (generally a spring connected with a screw) and at its place I put the service pressure of the first gas. By giving this new regulator the convenient dimensions a wanted proportion between the pressures of the gases will be automatically obtained, this being the first condition for obtaining thereafter a wanted proportion between the volumes of each gas in the mixture. It is sufficient now to give the holes for the flow of the gases, convenient dimensions according to the densities of each gas and to couple these holes in such a way that they can be opened or closed exactly at the same time only, and that in whatever position of opening they keep the original proportion between the free superficies for the flowing of the gases, and it will be now possible to command the total quantity of the mixture without ever changing the proportion between the volumes of each gas.

Devices of the kind are known in connection with the lighting industry. For instance two pressure regulators have been coupled in order to control the opening or closing of the flow of one gas by opening or closing the flow of the other one, however with such devices it was never the question or the intention of obtaining a wanted proportion between the volumes, a function which they are neither called nor fitted to fulfil.

The accompanying drawings show some different examples how the invention can be performed.

Figure 1:
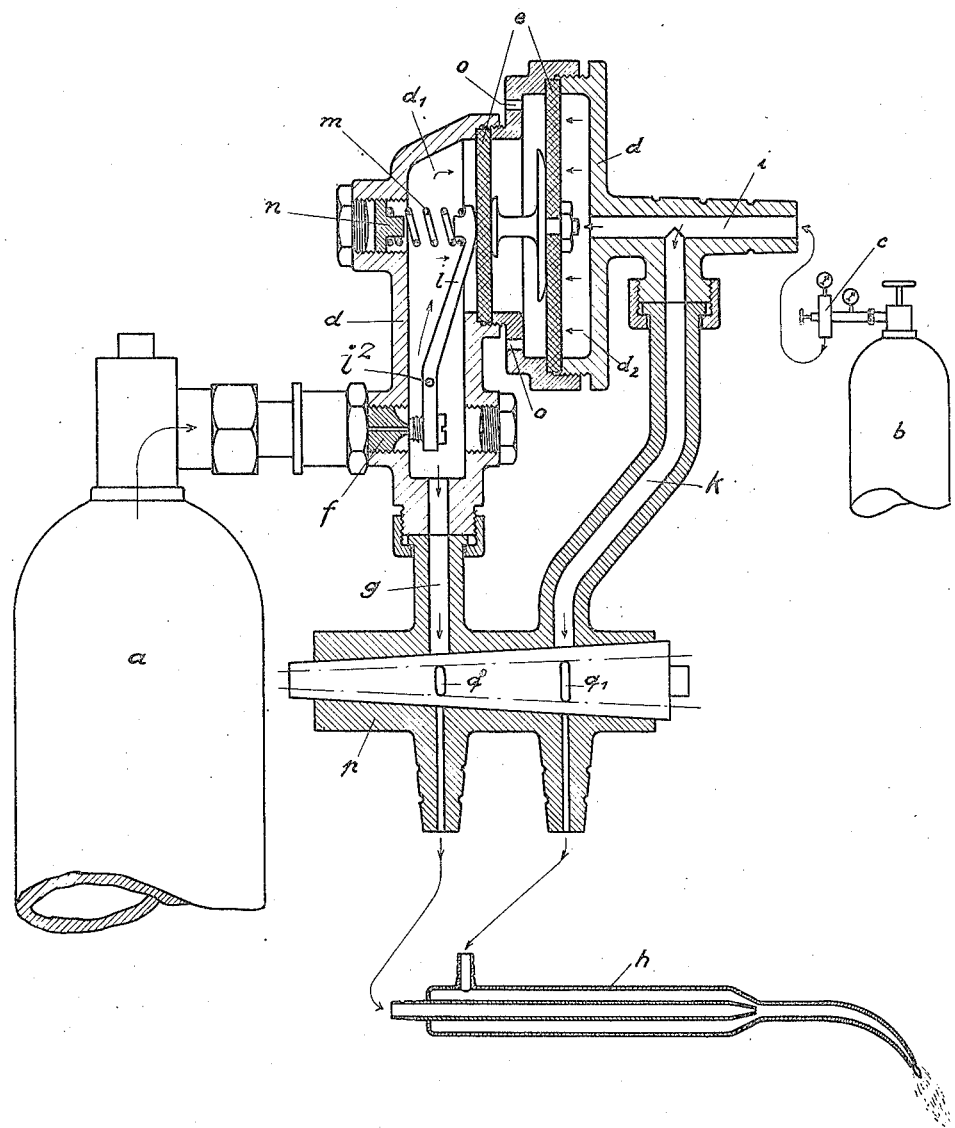
Fig. 1 shows partly in section and partly diagrammatically the complete embodiment of the invention.

$a$ and $b$ (Fig. 1) are the cylinders containing the two different gases, for instance acetylene and oxygen. The cylinder $b$ is provided with ordinary pressure regulators, by means of which the pressure of the gas leaving the cylinder can be controlled. The other cylinder $a$ is not provided with such an ordinary pressure regulator, but it is connected to a regulator of a special construction. This regulator consists of a casing $d$, which contains two compartments $d^1$ and $d^2$ separated one from another by means of a double vibrating diaphragm $e$. The compartment $d^1$ is connected to the cylinder $a$ by means of a nozzle $f$, and a second connection $g$ leads to the welding-pipe $h$. In a like manner the compartment $d^2$ is provided with two connections $i$ and $k$, one of which leads to the oxygen-cylinder $b$, whereas the other leads to the welding-pipe $h$. The nozzle $f$ can be opened and closed by means of a double-armed lever $l$, (pivoted at $l^2$ as shown) one end of which covers the orifice of the nozzle $f$ whereas the other end touches the one disc of the double diaphragm $e$. This end is held in a close contact with this disc by means of a spring $m$ which can be regulated by a screw $n$ situated in the wall of the casing $d$. The space between the two discs of the diaphragm $e$ is in connection with the free air by means of holes $o$ lying in the wall of the casing $d$. The connecting tubes $g$ and $k$ do not go directly to the welding-pipe $h$, but they are interrupted by means of a cock $p$. The plug of this cock has two holes $q$ and $q^1$, lying in the path of the two gases flowing through the tubes $g$ and $k$ to the welding-pipe $h$. The superficies of the holes $q$ and $q^1$ are dimensioned according to the densities of the gases and the holes are limited between two generating lines of the cone of the cock-plug so that by working this plug, the holes get opened or closed exactly at the same time and they keep in whatever position of opening the original proportion between the free superficies of flowing.

The oxygen stored in the cylinder $b$ after having passed through the pressure regulator $c$ flows under the service pressure through the tube $i$ into the chamber $d^2$ of the acetylene regulator $d$ at the foreside of the diaphragm $e$ and from here it flows through tube $k$ and dosing cock $p$ into the welding-pipe $h$. The pressure of the oxygen acting upon the diaphragm $e$ works the lever $l$ and the acetylene stored in the cylinder $a$ flows through the nozzle $f$ into the chamber $d^1$ of the regulator $d$ at the backside of the diaphragm $e$ thus acting upon this diaphragm until the equilibrium between the two service-pressures of both gases is established. In consequence of this the acetylene will flow under a pressure which is automatically governed by the oxygen pressure and is led through the tube $g$ and the dosing cock $p$ to the welding pipe $h$, the volumes of both gases being regulated by the holes $q$ and $q^1$.

For preventing any possible mixture of gases within the body of the regulator a double diaphragm $e$ is provided in the regulator $d$ (Fig. 1) with an interspace communicating with the free air. By giving this double diaphragm, convenient dimensions there is the possibility to compensate the pressure of the spring $m$.

The method is specially designed to be used in connection with oxy-acetylene welding and gives the possibility to produce automatically the right mixture of both gases in the proportion of 1:1, which was impossible to obtain by the usual way. According to the densities of oxygen and acetylene, being 1:0,9 the proportion between the superficies of the holes of the dosing device, it is necessary that the service pressure of both gases be exactly equal. Practically it is convenient to let the oxygen work the acetylene regulator, as the ordinary oxygen regulator may be in this case used for other purposes, but for the final result of my invention it is completely indifferent which one of the two gases will be taken as first one.

Figure 2:
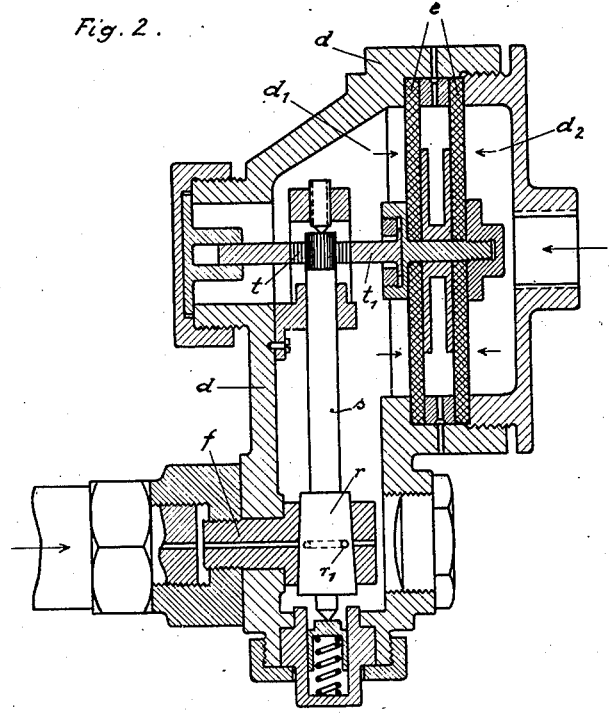
Fig. 2 shows a modification of the invention in a longitudinal section.

In the modification shown in Fig. 2 the lever actuating the nozzle $f$ is replaced by means of a cock-plug $r$ provided with an extension $s$ having on its upper end a gear $t$, which meshes with a rack $t^1$ attached to the diaphragm $e$. The plug $r$ has a bore $r^1$, lying in the level with the port of the path of the nozzle $f$. The diaphragm $e$ is actuated in a like manner as described above with respect to Figure 1 by means of the different pressures in the compartments $d^1$ and $d^2$ of the casing $d$. Following the movement of the diaphragm the plug $r$ is rotated, opening or closing thereby the nozzle $f$ and regulating thereby the flow of the gas coming from the gas-container.

Figure 3:
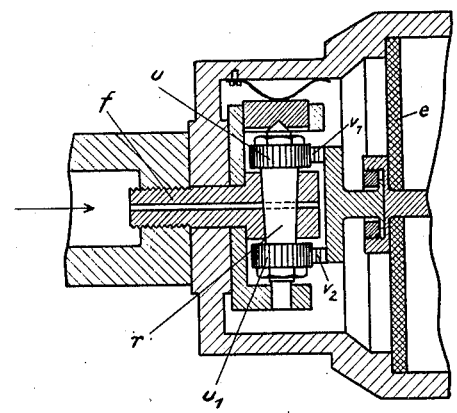
Fig. 3 shows a second modification of the invention in a cross-section.

Fig. 3 shows a second modification of the invention. In this modification the plug $r$ is horizontally arranged and the nozzle $f$ is placed opposite to the center of the diaphragm $e$. The plug $r$ is provided with two gears $u$ and $u^1$ meshing with racks $v^1$ and $v^2$ which are attached to the diaphragm $e$. As soon as the diaphragm moves in one or the other direction the plug $r$ is correspondingly rotated, controlling thereby the opening of the nozzle $f$.

I claim:

1. Apparatus for bringing gases to blow-torches and similar apparatus, comprising a gas conduit for conducting one of said gases, a separate conduit for conducting the other of said gases, a regulating means operated by the service pressure of one of said gases and operating to regulate the service pressure of the other of said gases, such regulating means comprising a double diaphragm with a space between the two portions of said diaphragm, and a gas connection between the outside of the apparatus and said space, and means for regulating or stopping the flow of said gases from such apparatus to the point of use.

2. Apparatus for bringing gases to blow-torches and similar apparatus, comprising a gas conduit for conducting one of said gases, a separate conduit for conducting the other gas, a regulating means operated by the service pressure of one of said gases and operating to regulate the service pressure of the other of said gases, such regulating means comprising a double diaphragm, a covered inlet port for the gas whose pressure is to be regulated, the cover being spring-pressed into a closing position, and a rigid pivoted connection between one face of the said diaphragm, and the said cover.

3. Apparatus for bringing gases to blow-torches and similar apparatus, comprising a gas conduit for conducting one of said gases, a separate conduit for conducting the other gas, a regulating means operated by the service pressure of one of said gases and operating to regulate the service pressure of the other of said gases, such regulating means comprising a diaphragm, operated by the pressure of the first mentioned gas and capable of opening a covered inlet port for said second gas, and a single-plug double-ported cock for simultaneously opening, partly opening or closing the flow of the two gases to the burner, and means for regulating or stopping the flow of said gases from such apparatus to the point of use.

4. Apparatus for bringing gases to blow-torches and similar apparatus, comprising a gas conduit for conducting one of said gases, a separate conduit for conducting the second gas, a regulating means operated by the service pressure of one of said gases and operating to regulate the service pressure of the other of said gases, such regulating means comprising a diaphragm, operated by the pressure of the first mentioned gas and capable of opening a covered inlet port for said second gas and a volume-regulating device arranged in the conduits to the burner having an opening for each gas and capable of maintaining a constant proportion between the areas of the two openings at every position of the volume-regulating device.

FRANCESCO MANGIAMELI.